Feb. 29, 1944.   G. Q. VOIGT   2,342,771
PHOTOMETRIC APPARATUS
Filed Nov. 9, 1938   3 Sheets-Sheet 1

George Quentin Voigt,
INVENTOR.
BY Stevens and Davis
ATTORNEYS.

Feb. 29, 1944.  G. Q. VOIGT  2,342,771
PHOTOMETRIC APPARATUS
Filed Nov. 9, 1938  3 Sheets-Sheet 2
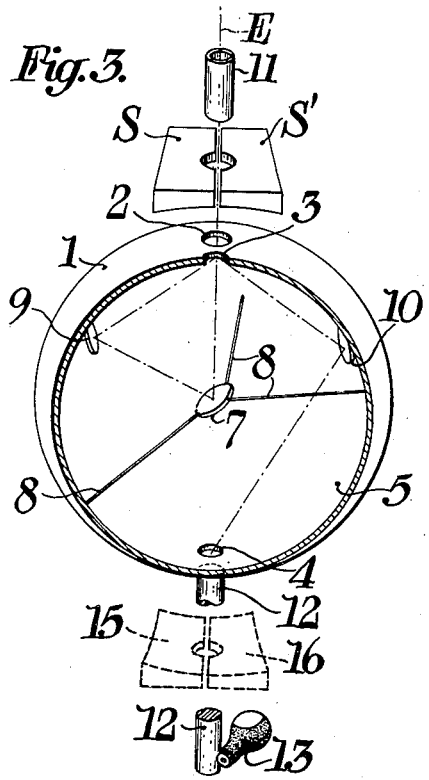
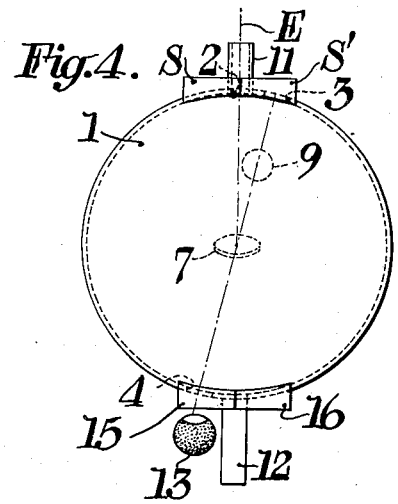
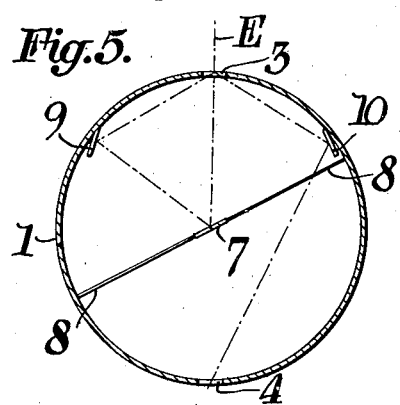
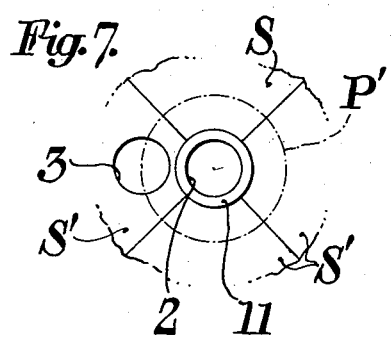
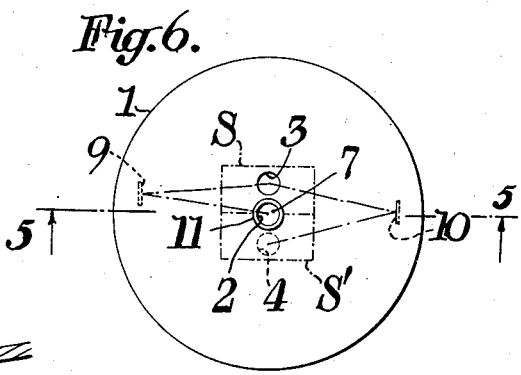
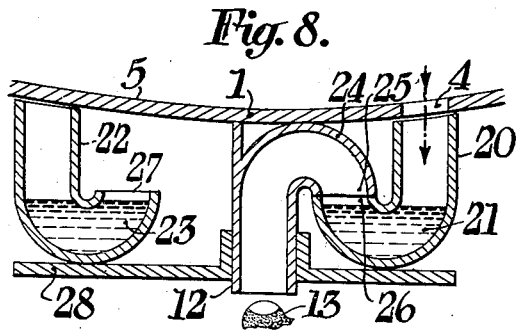
George Quentin Voigt,
INVENTOR.
BY Stevens and Davis
ATTORNEYS.

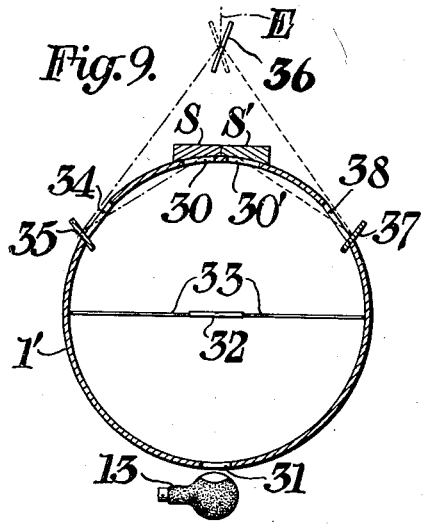
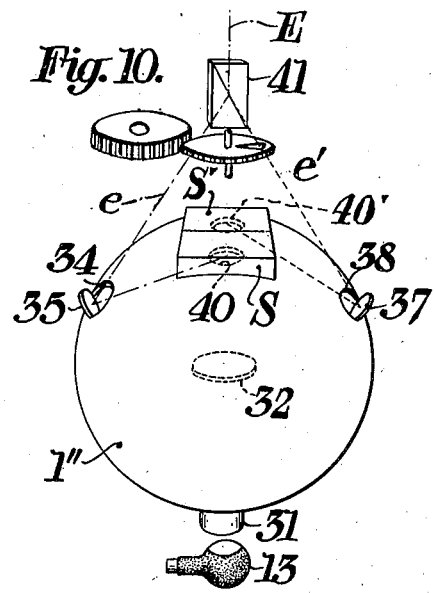
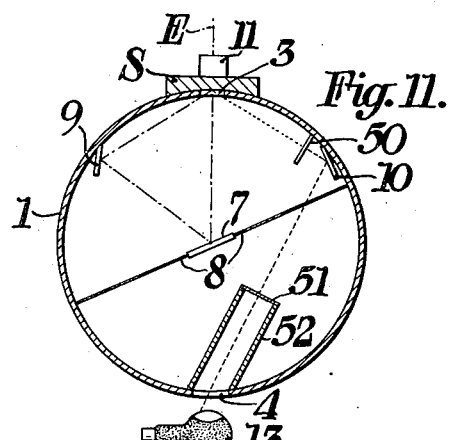
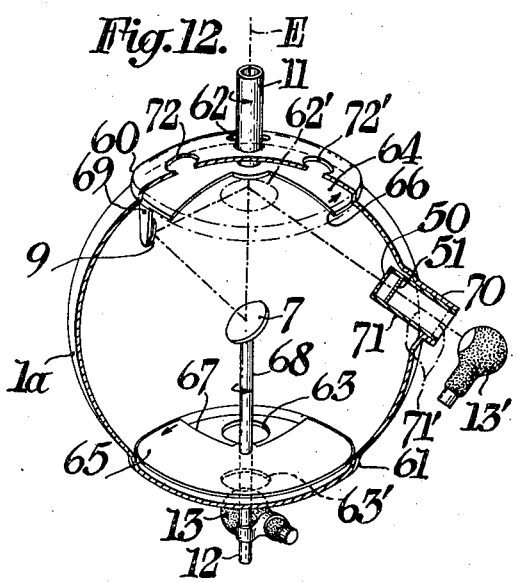
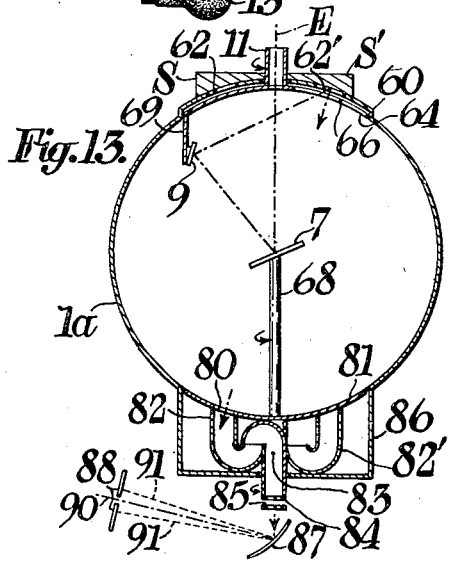

Patented Feb. 29, 1944

2,342,771

UNITED STATES PATENT OFFICE 2,342,771

PHOTOMETRIC APPARATUS

George Quentin Voigt, Washington, D. C., assignor of one-fourth to Robert F. Davis, Washington, D. C., and one-fourth to D. Hunter Smiley, Falls Church, Va.

Application November 9, 1938, Serial No. 239,735

7 Claims. (Cl. 88—14)

This invention relates to photo-metric apparatus and particularly to such apparatus which has been found useful in colorimetry, that is, in the determination of color values of various materials.

Heretofore it has been the general practice in colorimetry work to use photo-metric apparatus which employs light beams from a standard and a sample, said beams being directed so that they traversed different optical paths. With such apparatus, difficulty has frequently arisen in obtaining a high degree of precision due to the lack of similarity of the two optical paths resulting, for example, from the presence of a small amount of dirt on a lens or other optical member in one of the paths. Another difficulty in such apparatus has been in making the transition from one beam to the other with sufficient smoothness to avoid an objectionable change in the output of the photoelectric device when the two beams are of equal intensity.

Having in mind the defects of the prior colorimetric apparatus, it is an object of my invention to provide such an apparatus having a high degree of accuracy and precision. This apparatus is designed to provide identical optical paths for measuring the beams from both the standard and the sample. In addition, my newly discovered apparatus is relatively simple in design and may be produced at comparatively small cost. Furthermore, it is easy to operate and may be handled with accuracy by an inexperienced operator.

Due to the inaccuracy of the above described methods, I discovered that the desired degree of precision could be obtained by providing an apparatus wherein the light beams to and from the standard and sample traversed as near as possible, identical optical paths. This principle remains as the underlying feature upon which the improvements and adaptations hereinafter described are based. The method and means of color determination are further simplified by a reduction in the number of beams, the intensities of which are controlled during their projection onto test or tested substances.

The foregoing objects and others auxiliary thereto I prefer to accomplish by the use of a unidirectional light beam to measure the value of both the standard and the sample. According to a preferred embodiment of my invention, I provide a sphere for directing, collecting, and reflecting a single light beam to the standard and the sample; and therefrom to a measuring device. Specifically, the sphere is provided with three ports, two of which are diametrically opposed, one acting as a scanning port arranged to pass light to and from the standard and sample, and the other acting as a measuring port arranged to pass integrated light from said scanning port through said measuring port to a measuring apparatus, and a light admitting port adjacent the scanning port. A mirror is supported within the sphere substantially upon the axis of the scanning and measuring ports so as to reflect the light entering through a third port which is the light admitting port and is located adjacent the scanning port. In addition, this mirror forms a shield to prevent the light rays from passing directly through the sphere from the scanning port to the measuring port.

The mirror is supported on radially extending wires or struts and is positioned so as to reflect the light beam, received through the light admitting port, to another mirror mounted on the inner wall of the sphere. The second mirror is arranged to reflect the light beam through the scanning port to the standard and sample. The standard and sample are located outside of the sphere and are arranged about the port through which the beam enters said sphere. As the sphere is rotated about the axis of the light admitting port, the scanning port which is adjacent thereto travels in a small circle beneath the standard and sample to permit the reflected beam to alternately strike the test and tested substances. The light is then reflected by these substances back into the sphere to a point which is substantially diametrically opposed thereto, where the measuring port is located. A photoelectric or other measuring device may be located at this second port to register the intensity of the beams which are alternately reflected over identical optical paths. In addition, the sphere may be adapted to measure gloss and fluorescence characteristics. Likewise, if preferred, the sphere may be stationarily positioned, in which event it must be provided with rotary shutters and mirrors. Furthermore, the apparatus may be arranged to automatically calibrate the recording chart.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 3 is an exploded view in perspective, partially in section, of a light ray integrating sphere having a standard, a sample, and a measuring device associated therewith;

Fig. 4 is a view in elevation of the apparatus shown in Fig. 3 in normal position;

Fig. 5 is a cross-sectional view of the sphere taken along a line corresponding generally to the line 5—5 in Fig. 6;

Fig. 6 is a plan view of the top of the sphere;

Fig. 7 is a detail view of the light passing and scanning ports in the sphere;

Fig. 8 is a detail view of the measuring port in the sphere and of the measuring apparatus associated therewith;

Fig. 9 is a diagrammatic view in cross section of a modified form of sphere adapted for use in connection with the present apparatus;

Fig. 10 is a view in perspective of the modification shown in Fig. 9;

Fig. 11 is a diagrammatic view in cross section of a modified form of sphere incorporating polarizing means for measuring gloss characteristics;

Fig. 12 is a view in perspective and partially in cross section of a modified form of sphere having rotatable elements associated therewith so that the sphere may be held stationary; and Fig. 13 is a diagrammatic view in cross section of a modified form of stationary sphere having means associated therewith to measure fluorescence characteristics.

Figure 1:
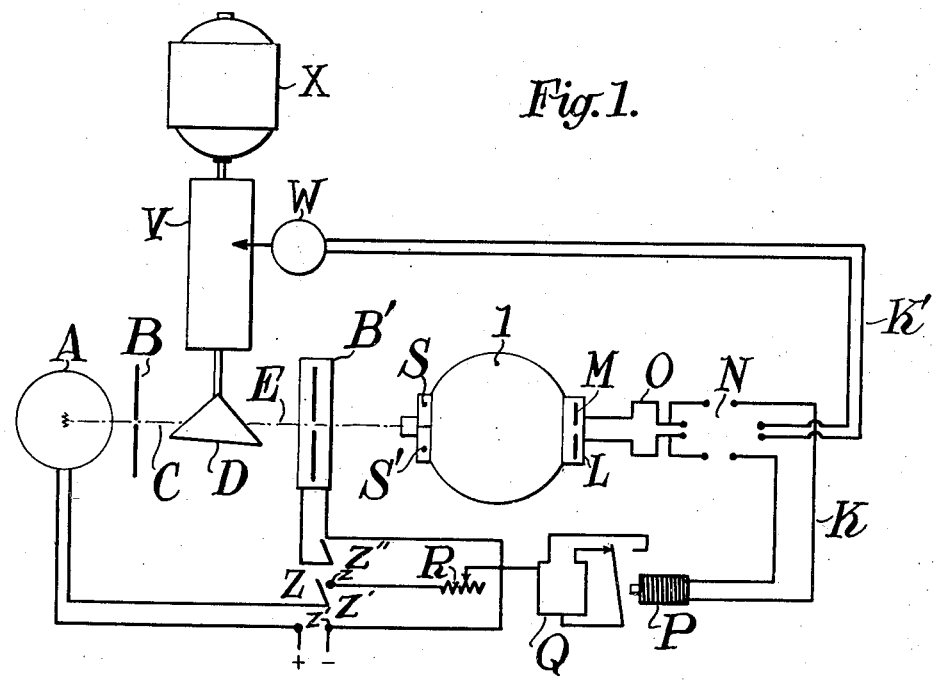
Fig. 1 is a diagrammatic layout of an entire photometric apparatus incorporating a light ray integrating sphere.

Colorimetry apparatus to overcome the defects hereinbefore enumerated must have at least two totally distinct characteristics; it must have light rays of constant value for measuring the value of the standard and sample; and it must provide equivalent or identical optical paths for these light rays to and from the standard and sample. Accordingly, a preferred apparatus embodying my invention is shown in Fig. 1 wherein a light source A may provide a light ray C that may be visible, invisible, or both, and which is directed through a controlling diaphragm B to a prism D or equivalent means of dispersion. This prism D is of the type which furnishes the desired portion of the visible or invisible spectra or both, and may be rotated, intermittently if desired, by suitable connections with the shaft T which is driven by the motor X. The prism D divides the light ray C into a continuous or non-continuous spectrum E which is directed through a slit B' of controlled dimensions to an integrating sphere I.

As will be more completely described hereinafter, when the spectrum E enters the sphere I, it is reflected therein to scan the standard S and sample S'. After the scanning step, the reflected ray is then integrated to a diaphragm M and to a measuring device L, which transforms the light energy into electrical energy of proportional intensity. The electrical energy set up by the device L is directed to an amplifier O, and thence to a commutator N which is adapted to direct the electrical impulse currents to their respective circuits. The electrical energy impulses resulting from the standard S are directed over the circuit K to a relay P, thence to a variable resistance R which is actuated by a motor Q. This arrangement controls the intensity of the light beam according to the manner in which the circuit is closed by the switch unit Z. The light source A may be controlled so as to produce a beam having a predetermined intensity, or the beam may be controlled by means of an automatically controlled shutter B' or equivalent optical means such, for instance, as a pair of Nicol prisms. If contact Z' is closed with stationary contact z the source A will be controlled by resistance R. The shutter B' may be controlled by the resistance R when the movable switch contact Z'' is closed with stationary contact z. The intensity of the projected beam may be controlled in either or both of the above described manners or in an equivalent manner. The electrical energy impulses resulting from the sample S' are directed over the circuit K' to a recording device such as a galvanometer or voltmeter W which is adapted to impress a record upon the drum V mounted upon the driven shaft T.

Figure 2:
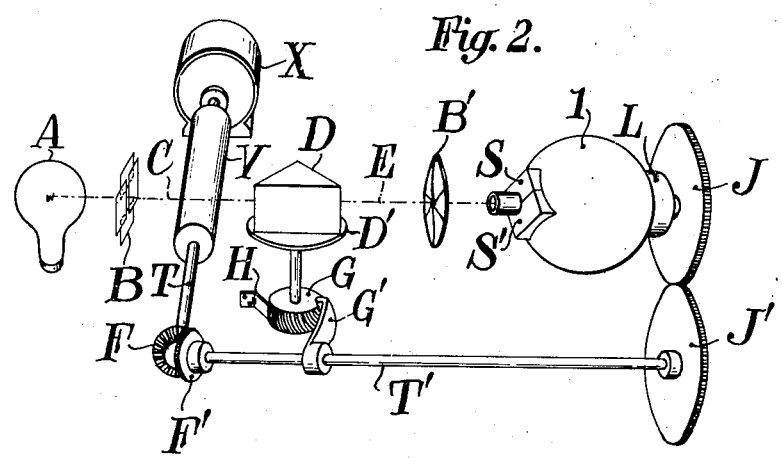
Fig. 2 is a diagrammatic view in perspective of the mechanically driven portions of the photometric apparatus.

The mechanical operation of the apparatus is diagrammatically shown in Fig. 2. The motor X may be coupled to the shaft T in any convenient manner, said shaft supporting the recording drum V and carrying a beveled gear F at its end. The beveled gear F meshes with a beveled gear F' carried by a shaft T' which extends substantially parallel to the optical axis of the apparatus. The shaft T' supports a gear segment G' arranged to intermittently mesh with a gear G which is adapted to rotate the structure D' supporting the prism D. A dog H cooperates with the gear G to prevent rotation thereof except while actually being driven by the gear segment G'. The shaft T' also drives a gear J' which is meshed with the gear J associated with the integrating sphere I whereby to rotate said sphere. By this driving means, the light ray C which emanates from the source A and passes through the controlling diaphragm B is dispersed by the prism D, said light ray C being divided into the spectrum E. The spectrum E is then passed through the diaphragm B' and into the rotating integrating sphere I.

The subject matter of the present invention is more particularly concerned with the means for using a unidirectional light beam for measuring both the standard and sample and which is specifically embodied in the integrating sphere I. As best shown in Fig. 3, the sphere I comprises a shell having a light passing port 2, a scanning port 3 adjacent the light passing port 2, and a measuring port 4 which is located substantially diametrically opposite the scanning port 3. The interior walls 5 of the shell I are preferably coated with a diffusing material to form a matte surface so as to completely integrate the reflection from the standard and sample through the scanning port 3 to the measuring port 4.

A series of mirrors are located within the shell I to direct the light beam which enters through the port 2. A mirror 7 is suspended in the path of the beam which enters the light passing port 2 and is preferably located in the exact center of the shell. The mirror 7 may be supported by a plurality of fine wires or struts 8 which extend from the mirror to the inner wall 5 of the shell I. This mirror 7 reflects the light beam to another mirror 9 which is secured to the inner wall 5 of the shell so as to reflect the light beam to the scanning port 3. The mirror 9 is arranged so that the direction of incidence of the unidirectional beam reflected therefrom to the scanning port lies at an angle of approximately 60° from the diametrical axis upon which the scanning port 3 and the measuring port 4 are positioned. After the standard and sample have been scanned, the reflectance therefrom is reflected throughout the inner walls of the shell and integrated through the measuring port 4. In the event that the substances being tested have glossy surfaces, an additional mirror 10 may be located on an inner side wall to receive the direct reflection from the scanning port 3 and to reflect said beam to the measuring port 4. It is to be noted that the axis of rotation of the sphere and the axis of reflection from the scanning port to the measuring port are at a slight angle to each other as shown in Fig. 4.

The sphere may be supported and rotated by a pair of axially spaced shafts 11 and 12. The shaft 11 may comprise a tube through which the unidirectional light beam or spectrum E is directed into the sphere. The shaft 12 may comprise a rotary or commutator member and may be driven in any suitable manner. As the scanning port 3 is closely adjacent the light passing port 2, the standard S and sample S' may be arranged around the shaft 11 so as to cover the scanning port 3 and the path it follows. As shown in Fig. 7, the scanning port 3 travels in a small circle about the light passing port 2, the path of said scanning port 3 being indicated by the circular broken line P'. As the scanning port 3 rotates through a circular path, the light beam directed therethrough from the mirror 9 is passed to the surfaces of the standard S and the sample S', whereupon it is reflected back into the sphere.

Although it is desirable that the standard S and sample S' have curved surfaces to conform to the surface of the sphere, deviations from sphere conditions may be had by sacrificing theoretical considerations for purposes of practical expediency. For instance, the standard S or sample S', or both, may have flat surfaces, or portions of the sphere at the regions near the ports may be flattened to better accommodate the flat surfaces of the standard and sample. A measuring device 13 may be located adjacent the measuring port 4 and rotated with the shaft 12. This measuring device may comprise any suitable member, and for the purposes of illustration, a photoelectric cell is shown in the present instance.

In some instances it is desirable to determine the transmission measurements of transparent or translucent materials which may be in either solid or liquid form. In such experiments, the scanning port 3 may be covered with a material of known reflectance so that the unidirectional light beam will be integrated at the measuring port 4 and directed through the test and tested substances. In the case of a solid material, a pair of blocks comprising a standard 15 and a sample 16 may be located adjacent the shaft 12 similarly to the aforementioned reflecting substances. The integrated light will thereby alternately pass through the standard 15 and sample 16 to the measuring device 13 as the sphere is rotated.

In the event that it is desired to measure the transmission qualities of liquids, an apparatus such as that shown in Fig. 8 may be used. In this arrangement, the integrated light which is directed through the measuring port 4 passes into a goose-neck tube 20 that is adapted to contain a liquid 21, which in this instance may be the standard. This tube 20 is interiorly coated with a material having good reflection qualities, and this coating may be highly resistant to the liquids which may be contained therein. Platinum has proved to be a most excellent material for this coating. The integrated light beam which is composed of a vast number of diffused rays passes through the measuring port 4 and into the tube 20. The integrated light beam is reflected by the walls of said tube 20 through the liquid 21 contained in the lower portion of the goose-neck, whereupon said diffused rays are again reflected by the curved walls upwardly to a measuring apparatus. A similar tube 22 may be located diametrically opposite the supporting shaft 12 and may contain a sample liquid 23, so that the integrated light rays will be intermittently passed through the port 4 into the tubes 20 and 22 as the sphere is rotated.

In this instance the supporting shaft 12 may be hollow and arranged to support and/or contain a measuring apparatus. A goose-neck tube 24 similar to the liquid-containing tubes may be supported by the shaft 12 in an inverted position and arranged so that the open end 25 adjacent the goose-neck 24 will substantially coincide with the open ends 26 and 27 of the liquid-containing tubes 20 and 22 as it is rotated by the shaft 12. This tube may likewise be coated with a material having good reflection characteristics so as to direct the integrated light rays, which have passed through the liquids 21 and 23 to a measuring device, such as the photoelectric cell 13. This cell may be located in any suitable and convenient position adjacent to or within the shaft 12 or the tube 24. The measuring device or cell 13 is preferably located adjacent the shaft 12 where it would not be necessary to move this device, due to the fact that the operation of said cell might possibly be affected by such movement. Various lengths of tubes may be used for containing liquids so as to measure the characteristics of these liquids according to variable densities thereof, and they may be supported by an adjustable bearing 28 to accommodate the various lengths.

A modified form of my integrating sphere is shown in Fig. 9, wherein the sphere does not have to be rotated. In this instance the sphere 1' is provided with two closely adjacent scanning ports 30 and 30' which are adapted to be covered by the standard S and the sample S'. A measuring port 31 is located substantially diametrically opposed to the two scanning ports 30 and 30', and a screen 32 is suspended by wires or struts 33 within the sphere to block any direct rays from said scanning ports 30 and 30' to the measuring port 31. A light admitting port 34 is located to one side of the sphere, and a mirror 35 is positioned in said light admitting port 34 so as to direct rays to the scanning port 30.

The spectrum E is cast upon the mirror 35 by a rotating or oscillating mirror 36 which will deflect the beam to the mirror 35, whereupon said beam will be reflected through the light admitting port 34 and cast into the scanning port 30 to strike the standard S. The light will thereby be reflected from the standard S back into the sphere to be integrated thereby, and this diffused light will then be measured at the port 31. In a similar manner the spectrum E will be deflected by the rotating mirror 36 to the mirror 37, whereupon the beam will be reflected through the light admitting port 38 and through the scanning port 30' onto the sample S'. After striking the sample S', said beam will be reflected back into the sphere and integrated therethrough to the measuring port 31. As the mirror 36 rotates, the spectrum E will be alternately directed through the ports 34 and 38 to the standard S and sample S' respectively.

The sphere may be further modified so as to cooperate with various types of apparatus now in use such as that shown in my prior Patent 1,881,336. This type of apparatus uses a Rochon or Wollaston type prism to divide the light beam so as to cast one ray upon the standard and another ray upon the sample. While this type of apparatus does not render the highly efficient results of the hereinbefore described apparatus wherein a unidirectional beam having the same optical path is used, nevertheless quite satisfactory results may be obtained thereby for most practical uses. As shown in Fig. 10 the sphere 1″ is quite similar to the sphere 1′ shown in Fig. 9. This sphere 1″ is provided with two opposed light admitting ports 34 and 38, mirrors 35 and 37 mounted within said light admitting ports 34 and 38, and two scanning ports 40 and 40′ located adjacent each other and midway between said light admitting ports 34 and 38. This sphere 1″ is also provided with a measuring port 31 and a mask 32 supported by struts 33 so as to intercept light rays reflected from the scanning ports 40 and 40′ directly toward the measuring port 31.

This sphere 1″ may be associated with a known type of apparatus which incorporates a prism 41 to divide the spectrum E. By this arrangement, the spectrum E may be received and divided by the prism 41 into a pair of angularly disposed rays e and e′. These rays are directed to the mirrors 35 and 37 whereupon they are reflected through the light admitting apertures 34 and 38 to the scanning ports 40 and 40′. As shown in my Patent 1,881,336, a shutter must be used to alternately intercept the rays e and e′. After passing through the scanning ports 40 and 40′, the rays are reflected by the standard S and sample S' and are thereafter integrated through the sphere to the measuring port 31 where the integrated rays may be measured by a suitable apparatus such as the photoelectric cell 13. This arrangement may be modified by closing the scanning ports 40 and 40′ and substituting the standard and sample in place of the mirrors 35 and 37.

In addition to the measurement of color values, this apparatus with slight modifications is also useful in measuring the gloss characteristics of various materials. For instance, a sphere such as shown in Figs. 3 to 6 may be used, in which event it may be necessary to include the mirror 10 within the sphere. Due to the fact that a light ray directed at a glossy surface at an incidence of approximately 60° becomes polarized, it is relatively simple to measure this surface reflected polarized light ray bearing the gloss characteristics and eliminate the incidental rays which bear color characteristics by the use of polarizing screens. As shown in Fig. 11, a tourmaline plate or other polarizing means 50 may be positioned in front of the mirror 10 so as to pass only the polarized rays bearing the gloss characteristics. As this filtered polarized ray is reflected from the mirror 10, it passes through another polarizing plate 51, to further filter the polarized ray after it has been reflected, and into a masking tube 52 which may be totally black so as to prevent the admittance of the integrated or incidental light and pass only the polarized light ray bearing the gloss characteristics through the measuring aperture 4 to the measuring device.

In the event that the sphere is to be used for measuring gloss only, it may be somewhat simplified by coating the interior of the shell 1 with a matte black which would absorb all incidental light rays and eliminating the tube 52. In this instance, the second polarizing screen 51 could be placed directly over the measuring port 4. According to a further modification, the polarizing means 51 may be positioned so as to receive the polarized beam adjacent to polarizing means 50, whereupon the mirror 10 may be dispensed with altogether. By such an arrangement the resultant light flux can be measured directly at a point adjacent the location of the mirror 10, as shown in Fig. 12.

It may be undesirable to use a rotating sphere, in which event it is necessary to incorporate rotating parts within a stationary sphere in order to secure the proper optical conditions. A stationary sphere which is provided with rotatable parts is diagrammatically shown in Fig. 12. According to this arrangement, the shell 1a of the sphere may be stationarily supported in any convenient manner and may be provided with diametrically opposed recesses 60 and 61 adjacent the scanning and measuring ports. A pair of scanning ports 62 and 62′ may be located within the upper recessed wall 60 and a pair of measuring ports 63 and 63′ may be located within the lower recessed wall 61. Rotatable shutters 64 and 65 are fitted within the recesses 60 and 61, respectively, and are arranged to control the operation of the light beam. These shutters 64 and 65 are provided with light passing sectors 66 and 67, and the shutters are mounted so that these light passing sectors 66 and 67 are diametrically opposed to each other.

In view of the fact that the sphere 1a is stationary, it is necessary to provide rotating mirrors within the sphere, and accordingly the mirror 7 which is adapted to initially receive the light beam within the sphere may be supported by a strut or shaft 68 which may also support the lower shutter 65. Likewise, the mirror 9 which is arranged to direct the light beam reflected from the mirror 7 to the scanning ports 62 and 62′ may be rotatably supported by mounting said mirror 9 in a bracket 69 which may be secured to the periphery of the upper shutter 64. The upper shutter 64 may be rotatably supported by the hollow shaft 11 which is arranged to pass the spectrum E to the mirror 7. This hollow shaft 11 may be driven in any convenient manner as heretofore explained. The mirror and shutter supporting shaft 68 may be coupled to the driven shaft 12 in any convenient manner, and said driven shaft 12 may also support the light measuring device such as the photoelectric cell 13 as heretofore described.

The operation of this arrangement is equally as simple as the hereinbefore described modifications. The spectrum E may enter the sphere through the hollow shaft 11 to strike the reflector 7. The beam will be reflected by the reflector 7 to the mirror or reflector 9, whereupon it is again reflected through the open sector 66 of the shutter 64 and intermittently passed through the scanning apertures 62 and 62′ as said shutter is rotated, to strike the surfaces of the standard S and sample S' at an angle of approximately 60°. The rays reflected from the surfaces of the standard S and sample S' are then integrated through the shell 1a, as hereinbefore described, and pass through the open sector 67 of the rotatable shutter 65 to intermittently pass through the measuring ports 63 and 63' to the photoelectric cell 13. For the sake of convenience, the recessed wall portions 60 and 61 of the sphere and the shutters 64 and 65 may be plane surfaces, and this type of surface is accurate enough for many practical purposes. In order to secure greater accuracy, however, the recessed walls and shutters may be cone-shaped or, as shown, may be spherical in shape to conform with the curvature of the walls of the sphere 1a.

In addition to making the standard color measurements, this sphere may be arranged to measure gloss characteristics as mentioned above. Instead of the arrangement shown in Fig. 11, the polarizing screens 50 and 51 may be placed parallel and closely adjacent each other directly in front of the position normally occupied by the mirror 10. In lieu of the mirror 10, however, the gloss measurements may be made directly at this spot by providing a gloss measuring port 70 at this point and a photoelectric cell or other measuring device 13' adjacent said port. The polarizing screens 50 and 51 may be supported by a tubular housing 71 which may be adapted to be inserted within the port 70. When not measuring the gloss characteristics, the housing 71 supporting said polarizing screens 50 and 51 may be removed from the sphere 1a and a cover 71' (shown in broken lines) may be inserted into the measuring port 70 to complete the formation of the sphere walls. If desired, the gloss characteristics may be measured simultaneously with the measuring of the color characteristics by the addition of two scanning ports 72 and 72' within the upper recessed wall 60. As the open sector 66 of the shutter 64 passes these ports 72 and 72', the polarized rays emanating from the surfaces of the standard S and sample S' will be cast directly to the polarizing screens 50 and 51 and thereafter through the measuring port 70 to the photoelectric cell 13'.

In conjunction with the above described apparatus, it is frequently desirable to have the recording chart properly calibrated. Automatic calibration of the recording chart may be obtained by the use of an intermittent energy impulse which may be directed over the recording circuit K' in any desired manner.

A system employed in conjunction with the foregoing methods and apparatus can be used to advantage in the measurement of such properties as fluorescence of materials. A sphere such as the stationary shell 1a shown in Fig. 12 may be used in combination with a double slit arrangement so that the energy impulse originates at the proper instant. One slit remains stationary, and the other slit is continuously rotated and is synchronized in position so as to pass energy corresponding to the substances under investigation. One of the originating substances is usually a standard non-active substance S which does not, for instance, fluoresce, whereas the other of the originating substances is a sample S' which may or may not fluoresce.

As shown in Fig. 13, a stationary sphere 1a is provided with a hollow shaft 11 for admitting the spectrum E and ports in the wall formation 60 for scanning the standard S and the sample S'. The reflected rays resulting from the scanning operation are integrated through the sphere 1a and passed through a port 80 which is located in a rotating shutter 81. Goose neck arrangements 82 and 82' similar to those shown in Fig. 8 are associated with a hollow driven shaft 83 which also supports the shutter 81. One end of each of the goose necks 82 and 82' is fixed adjacent the path of the port 80 so as to collect the integrated rays, and the other ends extend to the hollow shaft 83 which is provided with a mask 84 having a slit therein. A fixed mask 85 having a slit therein is located closely adjacent this mask 84 which is rotated by the shaft 83. The slits in these masks 84 and 85 may have the center portions blocked out to prevent a continuous leakage of the integrated light rays or other arrangements of the masks may be used. The wall of the sphere 1a may be extended adjacent the periphery of the shutter 81 to form a housing 86 to contain the goose necks 82 and 82' and prevent leakage of light.

The integrated light rays passed by the slits in the masks 84 and 85 are directed to a dispersive means 87 which may comprise a concave grating, a prism, or the like. The rays will then be reflected by said dispersive means 87 to a measuring means comprising twin sensitive surfaces 88 such as a typical twin phototube. It has been found that the rays which are reflected from a standard will travel in a substantially straight path such as indicated by the broken line 90, whereas the rays originating from a fluorescing body, such as a sample S', will deviate from said path as indicated by the dotted lines 91. Consequently, the twin sensitive surfaces may be adjustably mounted so that they may be arranged to pass the straight standard rays 90 therebetween whereby the deviating rays 91 from the fluorescing body will strike at least one of the twin sensitive plates 88. The frequency of the rays 91 can then be measured to determine the amount of fluorescence in the sample S'.

Fluorescence is measured by the amount of energy striking the sensitive surfaces 88 due to the relative difference in the paths 90 and 91 resulting from the differential dispersion from the dispersive means 87, and as registered by a variation in light flux on the twin-sensitive surfaces 88. When the electrical energy produced by the surfaces 88 is directed over the circuit K' it causes an inscription on the recording drum corresponding to the wavelength of the exciting energy, or in other words that originating from the standard. Equilibrium of the system at different wavelengths for the standard beam is maintained by locating the twin sensitive surfaces 88 at a position so as to receive equal impulses.

In this way fluorescence can be automatically detected and registered, where data taken without this feature would be registered in error at a particular wavelength of energy. The control of the position of equivalent impulse can be made by the rotation of the dispersive member 87, other parts remaining in a substantially stationary position, or by lateral movement of the surfaces 88 with the remainder of the elements being fixed. An equilibrium position is necessarily located at different positions across the spectrum, and this requires automatic control to constantly secure the non-fluorescing position so that the departure from this condition will represent fluorescence.

In view of the foregoing description, it is believed that the operation of the present invention is obvious. The light beam or spectrum E enters the top of the integrating sphere, preferably along the axis of rotation of the sphere, and is reflected by a mirror 7 toward another mirror 9 at the side of the sphere which is oriented so that the light which is incident thereupon will be reflected toward the scanning port where the test and tested substances appear as the sphere is rotated. The angle of incidence of a unidirectional beam upon a reflection sample has been found to be about 57 degrees in order that the reflected light flux as integrated by the sphere be representative of the sample. For practical purposes an angle of substantially 60° may be used. In the case where a substance appearing at the port opening possesses glossy characteristics, a third mirror 10 may be arranged opposite the second mirror 9 so that the light reflected from the glossy substance will become incident thereupon and will be reflected into the measuring port which lies diametrically opposite the scanning port. A polarizing or other means located in front of the measuring port can be oriented in such a manner as to determine the spectral range of reflected energy from the glossy substance in the same general manner as a Nicol prism performs as an analyzer prism.

It becomes apparent, therefore, that the third mirror 10 is not generally used in cases where the substances under consideration are adequately diffusing so that the scanning port becomes in fact an illuminated spot. Furthermore, as the sphere wall is coated with material of very desirable reflection characteristics, it becomes the ideal integrator for the reflected flux and the measuring port, which lies diametrically opposite this illuminated spot becomes the ideal spot at which the measurements should be made. In such cases of general reflection measurements no liquids are placed in the cup-shaped containers shown in Fig. 8. If it is desirable to study combination effects, however, this may be done by the mere insertion of the appropriate substances as desired. The assembly as shown permits the insertion of solid and liquid substances in combinations and in varying sizes since the substances under consideration are stationary at all times.

The need for preparing certain size samples or standards is also dispensed with, since the insertion of the substances is made outside of the sphere and is in this way independent of the rotation of the sphere. The two bocks shown at the top of the sphere in Fig. 3 are placed during actual measuring operations, close to the sphere so as to become as near as practically possible an integral part of the sphere wall. These blocks are shown in Fig. 4 with curved surfaces to conform to the curvature of the sphere. Deviations from sphere conditions, such as flattening portions of the sphere at the regions near the ports, and the like, may be had with sacrifice in theoretical considerations for purposes of practical expediency. The mirror 7 which is at or near the center of the sphere introduces little error in measurement if made of small dimensions. The mirror 7 can be made large enough to act as a mask for the diametrically opposed port openings, the back of the mirror having its reflection characteristics matched to that of the sphere walls.

The principle involved in the development of the present means of measuring radiant energy is that the substances under consideration are always measured under identical conditions, regardless of their physical shape or properties. In other words, when the standard S is illuminated, there are no other substances present in the sphere wall, nor are there other substances present to cause a relatively different condition when the remaining substances are illuminated, all substances being illuminated under the same conditions of wall illumination. For transmission measurements of liquids the light incident upon the surface of the liquid comes from all portions of the sphere, and both standard and sample are equally illuminated if two standard reflectances are inserted at the top scanning port or if the port is sealed. The interior surfaces of the collection tubes and cup shape liquid containers can be suitably surfaced with material which is shown to be resistant to the attack of substances existing in the container, without introducing an appreciable loss in energy. Since these containers are so designed that the light flux from the sphere passes through no other substance than that under observation, the extension of the applications of this method of measurement becomes practically limitless and depends only upon the device containing the sensitive element of detection.

By the use of one beam of light, performing the function of two beams used formerly, the required means for separating the beams is eliminated resulting in fewer parts, less absorption, and increased available energy. The ideal conditions of illumination for both reflectance and transmission samples are fulfilled, and the light traverses the identical optical path at all times regardless of the number of samples or the type of combinations in use. The speed of rotation depends on the operating characteristics of the remainder of an assembly if used in conjunction with other apparatus.

Although certain specific embodiments of the present invention have been shown and described, many modifications thereof are possible, and the present disclosure should be construed only in an illustrative sense. The present invention, therefore, is not to be restricted except insofar as is necessitated by the prior art and by the spirit of the appended claims.

I claim:

1. The method of measuring radiant energy which comprises producing a single beam of radiant energy, projecting said beam along an axis of an integrating means which axis extends past standard and sample specimens, bending said beam within said integrating means from said axis at an angle and directing said beam to strike said specimens at an angle of sixty degrees, moving said bent beam and said specimens relative to each other about said axis to affect said energy by individually striking said specimens while maintaining constant the angular and spacial relations, measuring said affected energy, and integrating said energy prior to its measurement.

2. In an apparatus for measuring radiant energy, a source of radiant energy, a housing means for directing a single beam of said energy from said source into said housing along an axis extending through the center of said housing, said housing having a plurality of ports including an energy admitting port located on said axis, at least one scanning port displaced from said axis, and a port for passing energy from said housing radiant energy path defining means supported by and within said housing for receiving said single beam of energy and bending said beam at an angle from said axis toward a scanning port, means for moving said housing and said path defining means about said axis while maintaining constant the angle of said bent beam, and means for measuring the energy emitted by said third mentioned port.

3. The method of measuring radiant energy which comprises producing a single beam of radiant energy, projecting said beam along an axis of an integrating means which axis extends past standard and sample specimens, bending said beam within said integrating means from said axis at an angle and directing said beam to strike said specimens, moving said bent beam and said specimens relative to each other about said axis to affect said energy by individually striking said specimens, measuring said affected energy, and integrating said energy prior to its measurement.

4. In an apparatus for measuring radiant energy, a source of radiant energy, a housing, means for directing a single beam of said energy from said source into said housing along an axis extending through the center of said housing, said housing including scanning means comprising a scanning port displaced from said axis, said housing having a plurality of ports, including an energy admitting port located on said axis, and a port for passing energy from said housing, radiant energy path defining means within said housing for receiving said single beam of energy and bending said beam at an angle from said axis toward said scanning port, means for moving said path defining means and said scanning means about said axis while maintaining constant the angle of said bent beam, and means for measuring the energy emitted by said third mentioned port.

5. In an apparatus for measuring radiant energy, a source of radiant energy, a housing, means for directing a single beam of said energy from said source into said housing along an axis extending through the center of said housing, said housing including scanning means, comprising a shutter having a scanning port displaced from said axis, said housing having a plurality of ports, including an energy admitting port located on said axis, and a port for passing energy from said housing, radiant energy path defining means within said housing for receiving said single beam of energy and bending said beam at an angle from said axis toward said scanning port, means for moving said path defining means and said scanning shutter about said axis while maintaining constant the angle of said bent beam, and means for measuring the energy emitted by said third mentioned port.

6. In an apparatus for measuring radiant energy, a source of radiant energy, integrating means, means for directing a single beam of said energy from said source into said integrating means along an axis extending through the center of said integrating means, scanning means incorporated with said integrating means, said scanning means comprising a scanning port displaced from said axis, said integrating means having a plurality of ports including an energy admitting port located on said axis, and a port for passing integrated energy from said integrating means, radiant energy path defining means within said integrating means for receiving said single beam of energy and bending said beam at an angle from said axis toward said scanning port, means for moving said path defining means and said scanning means about said axis while maintaining constant the angle of said bent beam, and means for measuring the integrated energy emitted by said third mentioned port.

7. In an apparatus for measuring radiant energy, a source of radiant energy, a housing, means for directing a single beam of said energy from said source into said housing along an axis extending through the center of said housing, said housing including scanning means comprising a scanning port displaced from said axis, said housing having a plurality of ports including an energy admitting port located on said axis, and a port for passing energy from said housing, radiant energy path defining means within said housing for receiving said single beam of energy and bending said beam at an angle from said axis toward said scanning port, polarizing means in the path of direct reflectance between said scanning port and said third mentioned port, means for moving said path defining means and said scanning means about said axis while maintaining constant the angle of said bent beam, and means for measuring the energy emitted by said third mentioned port.

GEORGE QUENTIN VOIGT.